Sept. 1, 1936.  R. A. BABEL  2,053,017
INTERNAL COMBUSTION ENGINE WITH RECIPROCATING BLADE
Filed Oct. 21, 1933  6 Sheets-Sheet 1.
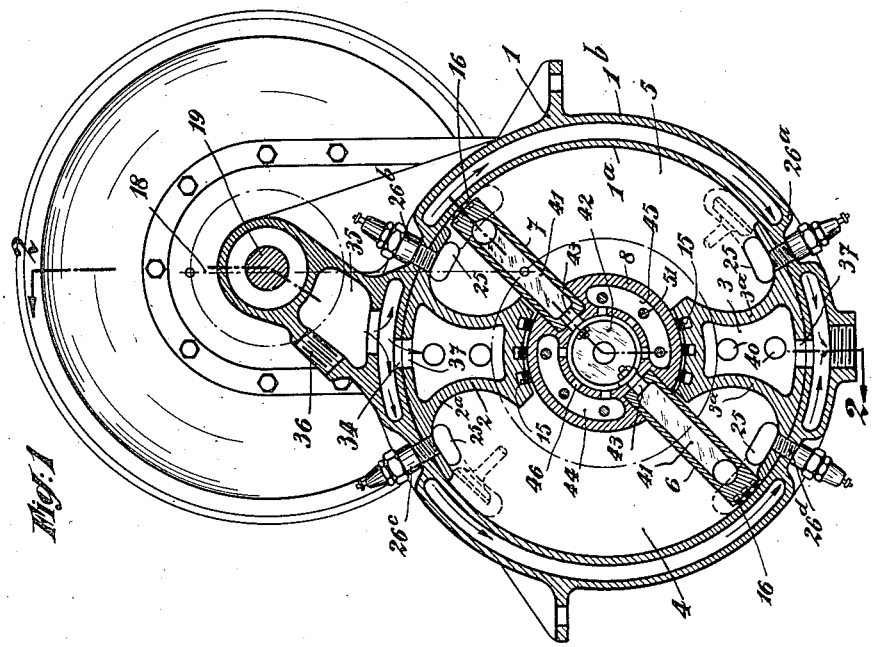
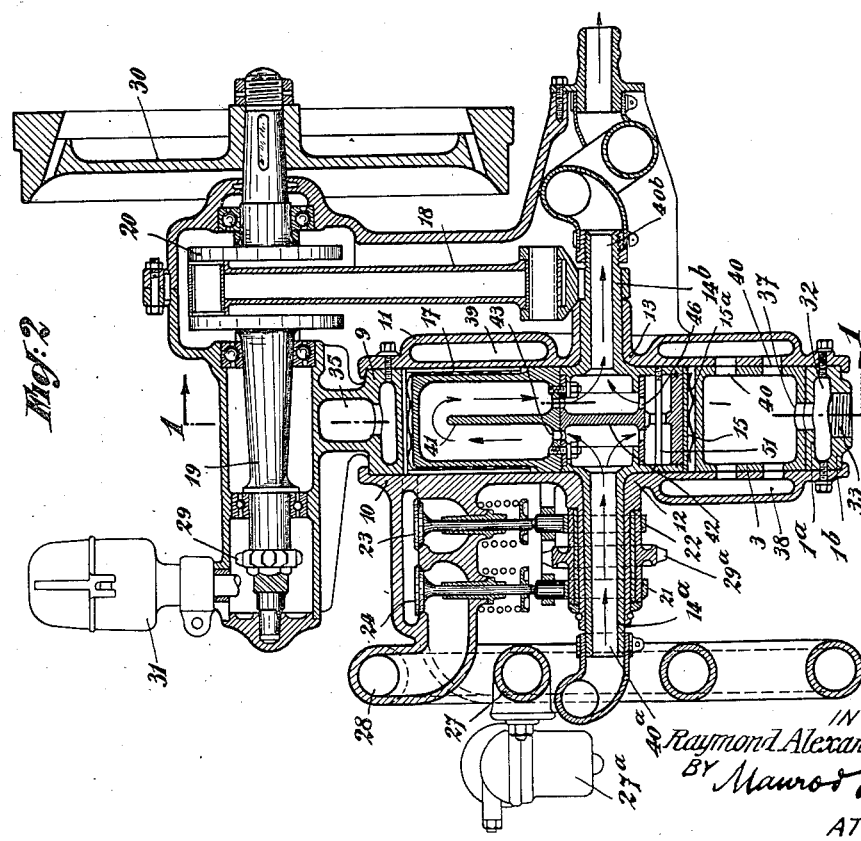
INVENTOR,
Raymond Alexandre Babel,
BY Mauro Lewis,
ATTORNEYS.

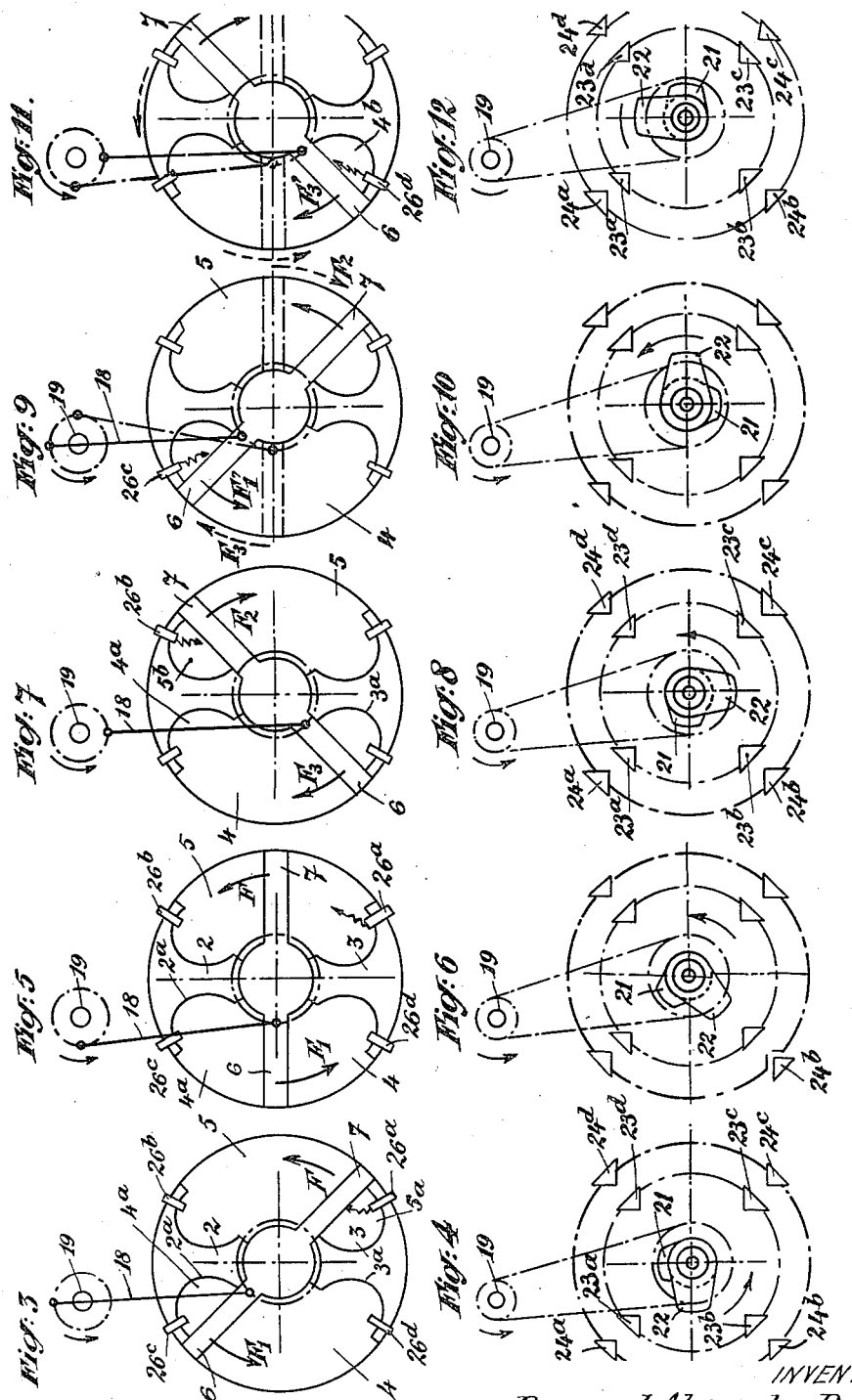

Sept. 1, 1936.   R. A. BABEL   2,053,017
INTERNAL COMBUSTION ENGINE WITH RECIPROCATING BLADE
Filed Oct. 21, 1933   6 Sheets-Sheet 3
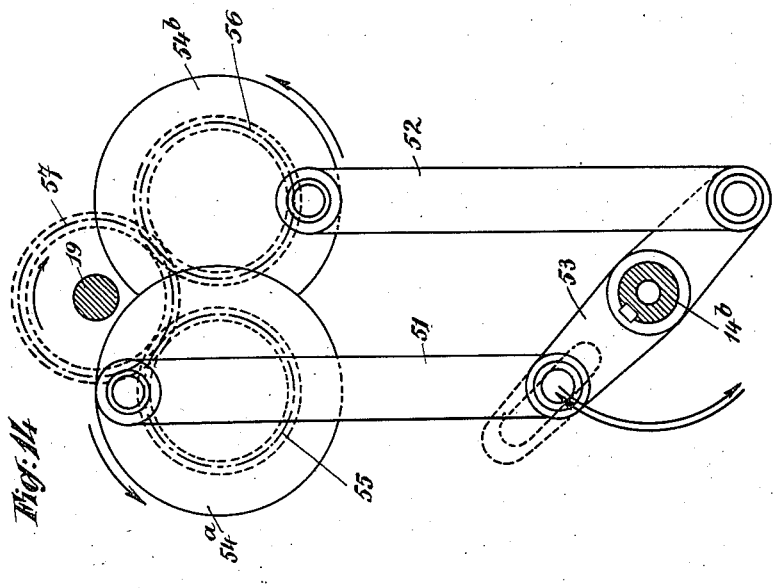
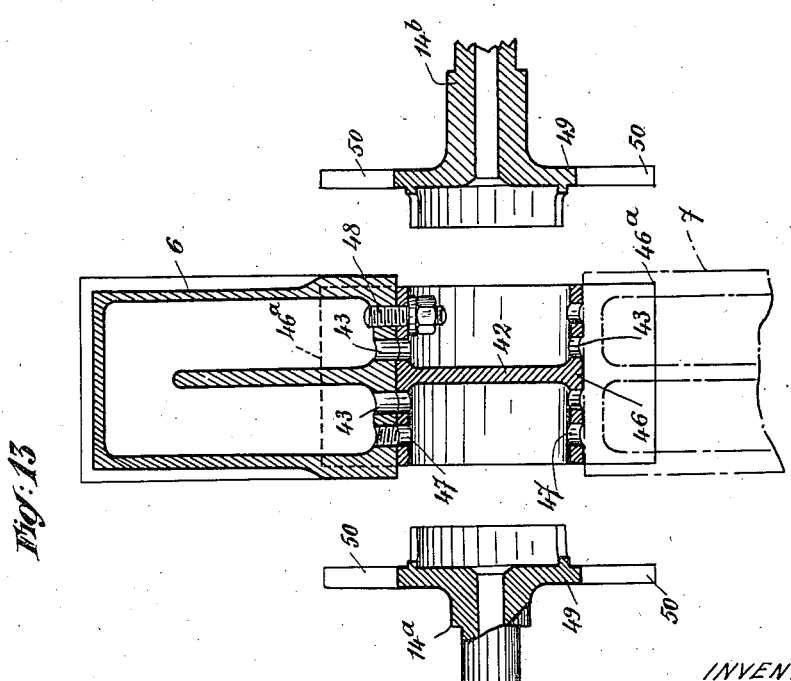
INVENTOR
Raymond Alexandre Babel,
BY
Mauro & Lewis,
ATTORNEYS.

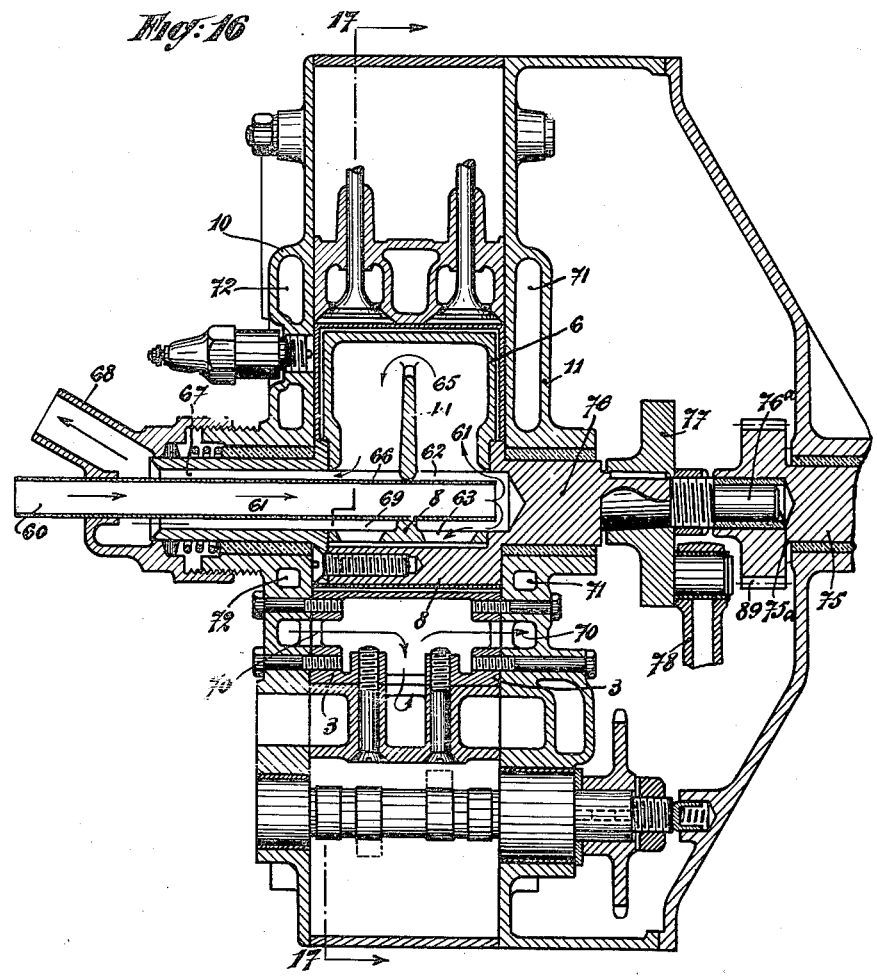

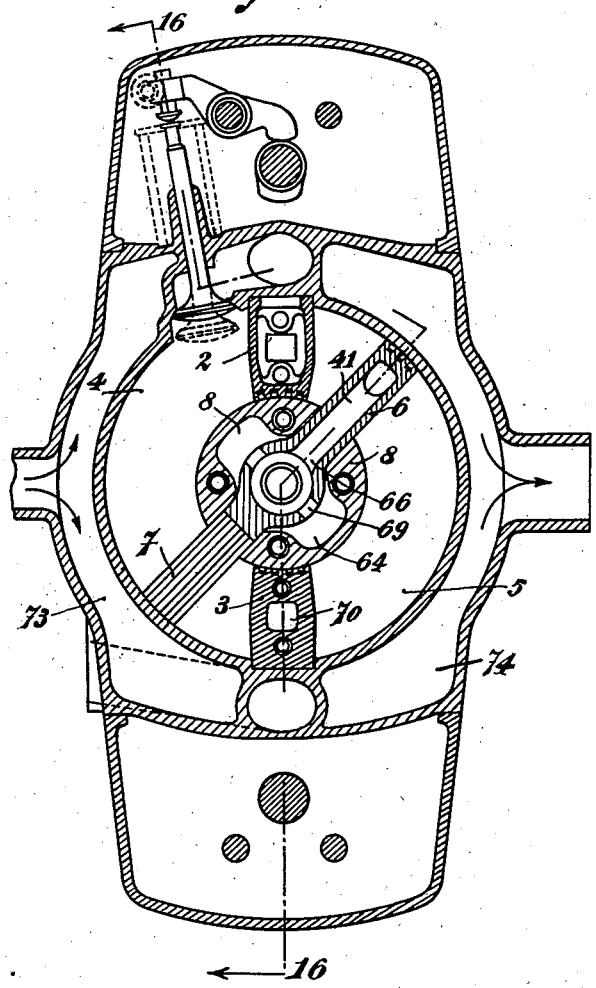

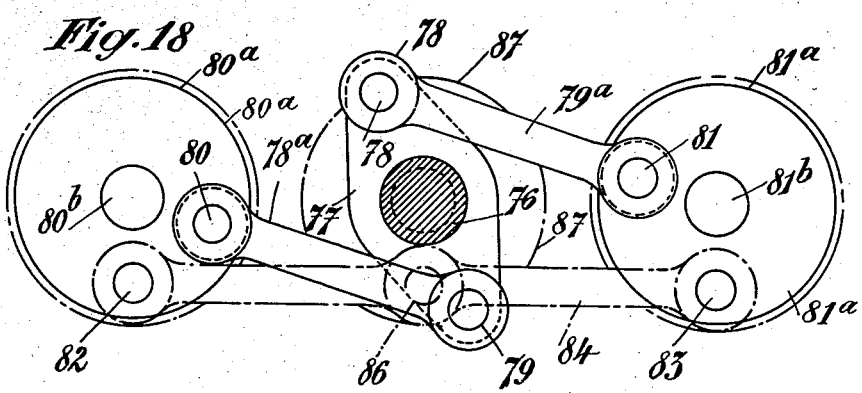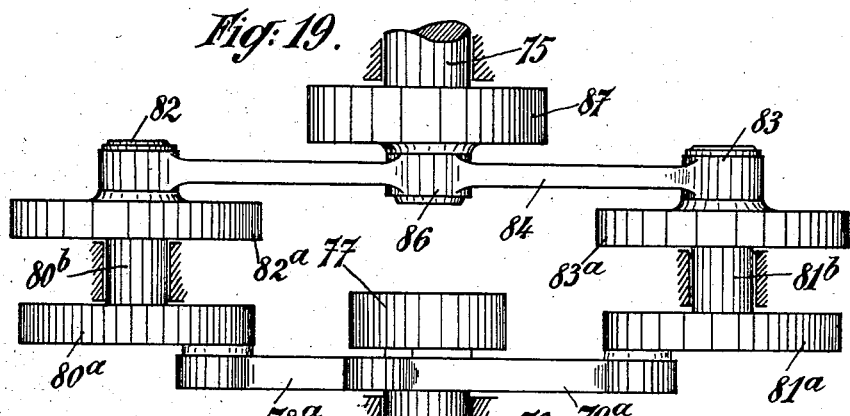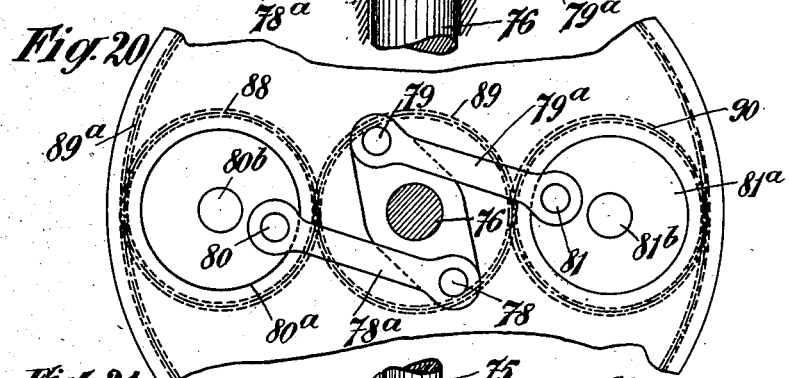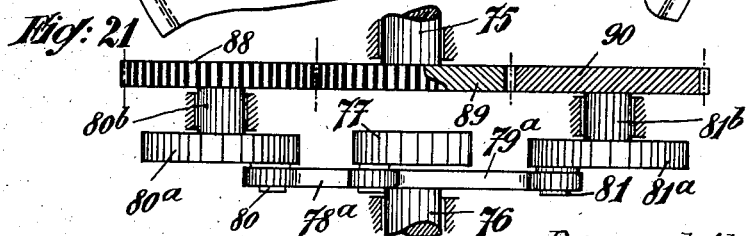

Patented Sept. 1, 1936

2,053,017

UNITED STATES PATENT OFFICE 2,053,017

INTERNAL COMBUSTION ENGINE WITH RECIPROCATING BLADES

Raymond Alexandre Babel, Clichy, France

Application October 21, 1933, Serial No. 694,647
In France October 22, 1932

6 Claims. (Cl. 74—42)

The present invention relates to internal combustion engines of the blade type.

The object of the present invention is to provide an internal combustion engine of the four stroke cycle type comprising essentially two chambers in which are disposed two diametral blades adapted to move with a reciprocating angular motion, said blades playing the part of pistons and being fixed to a common hub. The reciprocating rotary motion of this hub is transformed into a continuous rotary motion through any suitable means, for instance through a connecting rod or a series of connecting rods that drive a crank disc keyed on the driven shaft of the engine.

All the working parts of the engine are cooled by means of a suitably devised water circulation system.

This engine, which is perfectly balanced, due to the symmetrical distribution of the weight of the movable organs (diametrally opposed blades) further permits of admitting a large volume of carburetted mixture into the chambers at each stroke without involving a considerable weight or space occupied.

My invention also relates to the assembling of the different parts of the engine, in order to facilitate its manufacturing and its mounting.

Preferred embodiments of the present invention will be hereinafter described, with reference to the accompanying drawings, given merely by way of example, and in which:

Fig. 1 is a general vertical sectional view of the engine on the line 1—1 of Fig. 2;

Fig. 2 is an elevational sectional view on the line 2—2 of Fig. 1;

Figs. 3 to 12 are diagrammatical views for illustrating the working of the engine according to the present invention;

Fig. 13 is a detail view;

Fig. 14 is a view of another embodiment of the transmission;

Fig. 15 is a general view of another embodiment of the engine according to the present invention;

Fig. 16 is, on a larger scale, a vertical sectional view of the engine on the line 16—16 of Fig. 17;

Fig. 17 is a sectional view on the line 17—17 of Fig. 16;

Figs. 18 and 19 are an elevational view and a plan view respectively of an embodiment of the device for transforming the reciprocating motion into continuous rotary motion;

Figs. 20 and 21 are views similar to Figs. 18 and 19 respectively, illustrating another embodiment of the invention.

As shown by the drawings, and especially Figs. 1 and 2, the internal combustion engine according to the present invention essentially comprises a cylindrical casing 1 provided with partitions 2 and 3 so as to form two chambers 4 and 5. In these chambers can move with a reciprocating angular motion two blades 6 and 7 diametrally opposed and fixed to a common hub 8 concentrically positioned with respect to casing 1.

The cylindrical casing consists of a central portion 9 against which are applied, on either side thereof, two side plates or elements 10 and 11 respectively. These side elements are provided with parts 12 and 13 forming bearings adapted to receive the journals 14$^a$, 14$^b$ of hub 8, which turn in said bearings.

Partitions 2 and 3 consist of a kind of box of suitable width in order that it may fit exactly between side elements 9 and 10, as shown more particularly on the lower portion of Fig. 2.

The longitudinal faces of these boxes, which are suitably fixed to the cylindrical casing 1 through any suitable means, are curved as shown 25 at 2$^a$ and 3$^a$ in Fig. 1, and their transversal faces in contact with hub 8 are provided with brushes or packing members 15. Said packing members consist of rectilinear flat elements inserted in grooves provided in said faces, said elements being pushed outwardly by springs 15$^a$ inserted between the flat elements and the bottoms of the respective grooves.

Packing members 16 are also provided at the ends of blades 6 and 7 and also along their faces 35 in contact with side elements 10 and 11 as shown at 17 in Fig. 2.

A rod 18 connects one of the journals of the hub (journal 14$^b$ for instance) with the driven shaft 19 with which it is coupled through an eccentric disc 20.

The other journal 14$^a$ acts as an axis for a set two cams 21 and 22 rigidly connected together and free to rotate about said axis.

One of the side elements, 10, acts as a cylinder head and main for the admission and exhaust gases. This element 10 is provided with the inlet valves 23 and the outlet valves 24 placed in valve chambers that open through orifices 25 into casing 1 close to the concave portions of partitions 2 and 3.

Opposite these orifices are located the spark plugs 26$^a$, 26$^b$, 26$^c$, 26$^d$.

Pipes 27 and 28 serve to feed gases from carburetter 27ᵃ to the engine and to the exhaust, respectively.

Cams 21 and 22 are given a continuous rotary motion by driven shaft 19 through any transmission means, such for instance as sprocket wheels 29 and 29ᵃ, or gears.

A fly-wheel 30 helps the engine moving past the dead center points. The ratio of the radii of the cranks at the big end of the connecting rod and at the little end thereof respectively is so chosen that for a full angular stroke of one of the blades in one direction the connecting rod big end is caused to rotate through 180°. The plugs are successively ignited through a distributor 31.

The working of the engine the chief features of which have just been described is as follows, this working being described with particular reference to the diagrammatical views of Figs. 3 to 12.

As shown by these diagrammatical views, each of the chambers 4 and 5 is provided with two plugs 26ᵃ, 26ᵇ, 26ᶜ, 26ᵈ, with two inlet valves 23ᵃ, 23ᵇ—23ᶜ, 23ᵈ and also two outlet valves 24ᵃ, 24ᵇ—24ᶜ, 24ᵈ.

The engine works according to the four stroke cycle.

When the engine is being started, a certain amount of gas has been compressed in portion 5ᵃ of chamber 5 (Fig. 3). Plug 26ᵃ then causes these gases to be ignited and the explosion of the gases pushes blade 7 in the direction of arrow F, so as to bring it into the position shown in Fig. 7. In the course of this movement, blade 6, due to its displacement in the direction of arrow F¹, has produced a suction in the portion 4ᵃ of chamber 4, as shown in Fig. 5 which corresponds to an intermediate position of the blade, this suction being made possible by the opening of the inlet valve 23ᵃ (Figs. 4 and 6). This opening of the inlet valve is performed through the action of cam 21, which is moved angularly by the rotation of driven shaft 19. Figs. 5 and 6 clearly show how takes place the opening of valve 23ᵃ which is again closed when blades 6 and 7 have reached their extreme positions shown in Fig. 7.

In the course of the displacement of the blades cam 22, which is disposed at right angles to cam 21, has opened exhaust valve 23ᵇ, thus permitting the gases compressed by blade 6 to be driven out (Fig. 6).

In the course of its displacement, blade 7 has compressed the gases previously admitted into chamber 5 and has accumulated them in the portion 5ᵇ of said chamber. At the end of the stroke of this blade, the gaseous mixture is ignited by plug 26ᵇ as shown in Fig. 7; the resulting explosion pushes blade 7 in the direction of arrow F².

Blade 6 now moves in the direction of arrow F³ and compresses in portion 4ᵃ of chamber 4 the gases previously admitted into said chamber 4, as shown in Fig. 9. On the contrary, the gases burnt in the course of the preceding explosion in chamber 5 are driven out by plate 7 through valve 24ᶜ which has been opened by cam 22 in the course of its rotation when it has moved from the position shown in Fig. 8 to the position shown in Fig. 10.

In the course of its displacement in the direction of arrow F³, blade 6 has produced a suction in chamber 4, thus causing gases to enter through valve 23ᵇ opened by cam 21.

At the end of the stroke of blade 6, plug 26ᶜ produces a spark which causes the explosion of the gases compressed in chamber 4ᵃ and blade 6 is pushed back in the direction of arrow F'₁. In the course of this movement, it compresses in the portion 4ᵇ of chamber 4 the gases previously admitted through valve 23ᵇ and blade 7 drives out the gases burnt in chamber 5 through valve 24ᵈ opened by cam 22. In the course of the displacement of said blade gases are drawn in through valve 23ᶜ opened by cam 21.

At the end of the stroke of blade 6, plug 26ᵈ causes the explosion of the gases, thus pushing back said blade in the direction of arrow F"₃ and the cycle is repeated, thus producing successively suction, compression, explosion, and exhaust.

As it has been above explained and as it can be seen on the diagrammatical drawings, each stroke of the blades in a given direction causes the driven shaft to turn through 180°. It follows that, in order to obtain a suitable working of the valves under the action of the cams, it is necessary that the speed of revolution of said cams should be one half the speed of revolution of driven shaft 19.

In order to obtain a strong cooling, as it is necessary for a good working of the engine above described, a water circulation system is provided as follows:

The casing consists of two concentric partitions 1ᵃ and 1ᵇ forming an annular chamber at 32. Said chamber runs over the periphery of the casing and is provided with an outlet orifice 33, said water being admitted through orifice 34 opening into a chamber 35 provided on the casing and into which water is fed through orifice 36.

The water fed through orifice 34 also serves to cool partitions 2 and 3. The latter are hollow as shown by Figs. 1 and 2. They are connected to annular chamber 32 through an orifice 37.

Side elements 10 and 11 are provided, in their thickness, with annular conduits 38 and 39 through which flows cooling water fed through orifices 40 provided in the walls of the side elements and of partitions 2 and 3, as shown in Figs. 1 and 2.

Blades 6 and 7 and also their hub 8 are also suitably cooled as will be hereinafter described.

Each of the journals 14ᵃ, 14ᵇ is provided with a central conduit 40ᵃ, 40ᵇ. One of these conduits is connected to the water inlet and the other one to the water outlet.

Blades 6 and 7 are hollow as shown in Figs. 1 and 2, the hollow within each of them being provided with a middle partition 41 located in line with a partition 42 provided inside hub 8.

The cooling water coming in through conduit 40ᵃ for instance is directed by partition 42 into blades 6 and 7 through orifices 43. This water therefore flows through the blades according to the path indicated by the arrows of Fig. 2, and after cooling said blades it flows out through conduit 40ᵇ.

At the same time as it flows into blades 6 and 7 the incoming water also fills chambers 44 and 45 provided in hub 8 and thus cools the outer surface of said hub.

The cooling water penetrates into chambers 44 and 45 through holes 46 (Figs. 1 and 2).

Owing to this arrangement, it is clear that all the surfaces that might become too much heated by friction are suitably cooled, as well for the casing as for the blades and their hub.

A particularly interesting method of fitting the blades on the hub has been shown by way of example in Fig. 13.

The hub 8 consists of a central mass 46, in which has been provided the middle partition 42, and of two side members 49 fixed to said central mass 46 and which are integral with journals 14ª, 14ᵇ. This mass 46 is provided on the one hand with holes 43 through which the cooling water flows as above explained and, on the other hand, with holes 47 in which are engaged studs 48 fixed to blades 6 and 7 and serving to fix them to the central mass 46.

Said part 46 is provided with recesses 46ª as shown in Figs. 1 and 13, in which fit the inner ends of blades 6 and 7.

After the blades have been fixed to part 46, the two side members 49 are applied laterally against said part 46, said members 49 being themselves provided with recesses 50 in which the blades can be inserted.

Members 49 are fixed by means of bolts 51 (Figs. 1 and 2) the whole forming a mechanical structure that is easy to manufacture.

It has been above explained that the reciprocating movement of the blades is transformed into a continuous circular movement by the connecting rod 18 coupled with shaft 19.

According to another embodiment of the present invention, this movement is obtained by means of two connecting rods 51—52 (Fig. 14) pivoted to a pivoting element 53 itself keyed on the shaft that carries the blades (journal 14ᵇ).

The big ends of the connecting rods are each connected to a crank disc 54ª 54ᵇ, respectively, a pinion 55—56 being keyed on the shaft of each of these discs respectively. Both of these pinions mesh with a third pinion 57 which is keyed on the driven shaft 19.

It will be readily understood that this arrangement makes it possible to obtain an accurate balancing, the connecting rods working synchronously and symmetrically with respect to each other.

In the case in which the movement is to be transmitted through a single connecting rod, it is possible to vary the rate of compression by radially displacing the point at which the little end of the connecting rod is pivoted to the member angularly fixed to the shaft of the blades. It is thus possible to adjust the stroke of the blades.

A very simple embodiment of this idea, given merely by way of example, consists in fixing the little end of the connecting rod in an elongated slot in which the axis of the articulation can be displaced and adjustably fixed, as shown in dotted lines in Fig. 14.

In the embodiment of the engine shown in Figs. 16 and 17, the water circulation system for cooling blades 6 and 7 and their hub 8 is made as follows:

A central conduit 60 serves to feed the cooling water in the direction of the arrows 61. Said water is distributed, on the one hand, through apertures 62, to the inside of blades 6 and 7 and, on the other hand, through apertures 63 to chambers 64 provided in the mass of hub 6.

Partitions 41 provided as it has been above described compel the incoming water to follow the path of travel indicated by arrows 65 (Fig. 16), thus ensuring a perfect cooling of each of the blades. The water is then evacuated through orifices 66 opening into an annular chamber 67 and it is finally drawn in by the water circulation pump connected to pipe 68.

The water that has cooled the hub escapes from chambers 64 through orifices 69 which also open into annular chamber 67.

The cooling of the casing forming the two chambers in which the blades move is ensured as above described. Orifices 70 provided in the partitions 2 and 3 that separate said two chambers permit the flow of cooling water passing through conduits or recesses such as 71 and 72 provided in end elements 10 and 11.

Furthermore, chambers 73 and 74, disposed concentrically around chambers 4 and 5 (Fig. 17) ensure the full cooling of said chambers 4 and 5.

Owing to the fact that the cooling water is fed and evacuated on the same side of the casing, as shown at 60 and 68, it is possible to dispose fly-wheel 30 in line with the shaft of the blades, as shown in Fig. 15, said fly-wheel being for instance keyed on shaft 75 (Figs. 15 and 16).

Said shaft 75 is connected in any suitable manner to shaft 76, which is given an angular and reciprocating movement by blades 6 and 7.

Figs. 18 to 21 show an embodiment of this connection which must further permit the transformation of the reciprocating angular movement of shaft 76 into a continuous rotary movement of shaft 75.

According to a first embodiment shown in Figs. 18 and 19 this transformation of the movement is obtained by means of a suitable system of connecting rods. At the end of shaft 76 there is keyed a crank disc 77 carrying two crank pins 78—79 disposed along opposite radii of said disc. On said crank pins are mounted connecting rods 78ª—79ª the other ends of which are pivoted respectively to the crank pins 80—81 of two crank discs 80ª—81ª, the shafts 80ᵇ—81ᵇ of which turn in a continuous manner in stationary bearings. These shafts further carry other crank discs 82ª—83ª the crank pins 82—83 of which are connected together by a common rod 84 the ends of which are pivoted about said crank pins 82—83 respectively. The middle of said common rod 84 is pivoted about the crank pin 86 of a crank disc 87 keyed on the driven shaft 75.

It will be readily understood that the angular displacements of disc 77 cause discs 80ª and 81ª to rotate and to transmit their movement to disc 87 (keyed on shaft 75) through the common connecting rod 84 pivoted about crank pin 86.

According to another embodiment shown in Figs. 20 and 21, connecting rod 84 is replaced by a set of gears such as 88—89—90, the central gear 89 being keyed on shaft 75 instead of disc 87. The central gear 89 might also be replaced by a wheel 89ª having inwardly projecting teeth, which permits of obtaining a greater reduction.

Figs. 18 to 21 are diagrammatical views intended to facilitate the perfect understanding of the manner in which the device works, but Figure 16 shows how shafts 76 and 75 can be arranged. It will be seen that, in order to perfectly center them it is advantageous to provide a prolonged part 76ª of shaft 76 and to engage it in a housing 75ª provided in shaft 75.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a structure including two shafts, a device for transforming the reciprocating angular motion of one shaft into a continuous rotary motion of the other shaft, which comprises, in combination, a crank member fixed to said first mentioned shaft transversely thereto extending on either side of said first mentioned shaft, two connecting rods pivoted to said crank member at points thereof located on either side of said first mentioned shaft respectively and in the same plane, two cranks, crank pins for said cranks respectively pivotally connected to the other ends of connecting rods respectively, and means for operatively connecting both of said cranks with said second mentioned shaft.

2. In a structure including two parallel shafts, a device for transforming the reciprocating angular movement of one of said shafts into a continuous rotary movement of the other shaft, which comprises, in combination, a double crank member keyed on the first mentioned shaft transversely thereto, two crank pins on said crank member located on either side of said first mentioned shaft, two shaft elements parallel to the first mentioned shaft and located on either side thereof so that the axes of these two shaft elements and of the first mentioned shaft are located in the same plane, a crank keyed on each of these shaft elements, a crank pin on each of these last mentioned cranks, a connecting rod connecting each crank pin of said double crank member with one of said last mentioned crank pins respectively, and means for angularly connecting both of the two last mentioned shaft members with the second mentioned shaft.

3. In a structure including two parallel shafts, a device for transforming the reciprocating angular movement of one of said shafts into a continuous rotary movement of the other shaft, which comprises, in combination, a double crank member keyed on the first mentioned shaft transversely thereto, two crank pins on said crank member located on either side of said first mentioned shaft, two shaft elements parallel to the first mentioned shaft and located on either side thereof so that the axes of these two shaft elements and of the first mentioned shaft are located in the same plane, a crank keyed on each of these shaft elements, a crank pin on each of these last mentioned cranks, a connecting rod connecting each crank pin of said double crank member to one of said last mentioned crank pins respectively, another crank keyed on each of these shaft elements, and means for connecting both of the two last mentioned cranks to the second mentioned shaft.

4. In a structure including two parallel shafts, a device for transforming the reciprocating angular movement of one of said shafts into a continuous rotary movement of the other shaft, which comprises, in combination, a double crank member keyed on the first mentioned shaft transversely thereto, two crank pins on said crank member located on either side of said first mentioned shaft, two shaft elements parallel to the first mentioned shaft and located on either side thereof so that the axes of these two shaft elements and of the first mentioned shaft are located in the same plane, a crank keyed on each of these shaft elements, a crank pin on each of these last mentioned cranks, a connecting rod connecting each crank pin of said double crank member with one of said last mentioned crank pins respectively, another crank keyed on each of these shaft elements, a crank pin on each of the two last mentioned cranks, a connecting rod connecting both of these last mentioned crank pins together, and a crank member connecting an intermediate point of this last mentioned connecting rod with the second mentioned shaft.

5. In a structure including two parallel shafts, a device for transforming the reciprocating angular movement of one of said shafts into a continuous rotary movement of the other shaft, which comprises, in combination, a double crank member keyed on the first mentioned shaft, transversely thereto, two crank pins on said crank member located on either side of said first mentioned shaft, two shaft elements parallel to the first mentioned shaft and located on either side thereof so that the axes of these two shaft elements and of the first mentioned shaft are located in the same plane, a crank disc keyed on each of these shaft elements, a crank pin on each of these crank discs, a connecting rod connecting a crank pin of said double crank member with one of said last mentioned crank pins respectively, another crank disc keyed on each of these shaft elements, a crank pin on each of the two last mentioned crank discs, a crank disc keyed on the second mentioned shaft, a crank pin on the last mentioned crank disc, and a connecting rod pivotally connected to the three last mentioned crank discs about the crank pins thereof.

6. In a structure including two shafts in line with each other, a device for transforming the reciprocating angular movement of one of said shafts into a continuous rotary movement of the other shaft, which comprises, in combination, a double crank member keyed on the first mentioned shaft transversely thereto, two crank pins on said crank member located on either side of said first mentioned shaft, two shaft elements parallel to the first mentioned shaft and located on either side thereof so that the axes of these two shaft elements and of the first mentioned shaft are located in the same plane, a crank keyed on each of these shaft elements, a crank pin on each of these last mentioned cranks, a connecting rod connecting a crank pin of said double crank member to one of the two last mentioned crank pins respectively, a toothed wheel keyed on each of these shaft elements, and a toothed wheel keyed to the second mentioned shaft and meshing with both of these toothed wheels, for connecting both of these shaft elements with said second mentioned shaft.

RAYMOND ALEXANDRE BABEL.